(12) United States Patent
Otsuki et al.

(10) Patent No.: US 12,076,899 B2
(45) Date of Patent: Sep. 3, 2024

(54) MOLDING MACHINE MANAGEMENT SYSTEM AND COMPUTER PROGRAM

(71) Applicant: Seiko Epson Corporation, Tokyo (JP)

(72) Inventors: Yoshiaki Otsuki, Matsumoto (JP); Ko Tsukada, Matsumoto (JP); Yusuke Mitsuma, Shiojiri (JP)

(73) Assignee: SEIKO EPSON CORPORATION (JP)

( * ) Notice: Subject to any disclaimer, the term of this patent is extended or adjusted under 35 U.S.C. 154(b) by 150 days.

(21) Appl. No.: 17/455,102

(22) Filed: Nov. 16, 2021

(65) Prior Publication Data

US 2022/0152903 A1     May 19, 2022

(30) Foreign Application Priority Data

Nov. 17, 2020   (JP) ................. 2020-191044

(51) Int. Cl.
   *B29C 45/76*    (2006.01)
   *B29C 45/26*    (2006.01)

(52) U.S. Cl.
   CPC ........ *B29C 45/768* (2013.01); *B29C 45/7686* (2013.01); *B29C 2045/2683* (2013.01); *B29C 2045/7606* (2013.01); *B29C 2945/76163* (2013.01); *B29C 2945/7629* (2013.01); *B29C 2945/76464* (2013.01)

(58) Field of Classification Search
   CPC .. B29C 2045/7606; B29C 2945/76464; B29C 2045/2683; B29C 45/7686
   See application file for complete search history.

(56) References Cited

U.S. PATENT DOCUMENTS

2016/0114513 A1*  4/2016  Tsuchiya ............... B29C 45/17
                                              425/150
2017/0291343 A1* 10/2017  Uchiyama .............. G01N 21/88
(Continued)

FOREIGN PATENT DOCUMENTS

CN      111919108 A    11/2020
JP      2005-297218 A  10/2005
(Continued)

OTHER PUBLICATIONS

Translation of JP 2009-61786 ("Moriwaki") (Year: 2009).*
Translation of JP 4,322,792 ("Uno") (Year: 2009).*
Translation of JP 2015-219149 ("Ishida") (Year: 2015).*

*Primary Examiner* — John J DeRusso
(74) *Attorney, Agent, or Firm* — Harness, Dickey & Pierce, P.L.C.

(57) ABSTRACT

A molding machine management system includes a molding machine molding a plurality of molded products using a molding mold having a plurality of cavities, a camera capturing a plurality of first images of the plurality of molded products, respectively, and an inspection device inspecting the plurality of molded products. The plurality of first images, a second image of a parting surface of the molding mold, a plurality of inspection results corresponding to the plurality of molded products, and information on the plurality of cavities are displayed on the same screen of a display. The plurality of molded products in the plurality of first images are respectively displayed to overlap positions of corresponding cavities of the plurality of cavities of the parting surface in the second image.

6 Claims, 5 Drawing Sheets

(56) References Cited

U.S. PATENT DOCUMENTS

2021/0090243 A1    3/2021  Kawanishi et al.
2021/0304392 A1*   9/2021  Ota .......................... G06F 3/14

FOREIGN PATENT DOCUMENTS

| JP | 2006-175619 A  |   | 7/2006  |
|----|----------------|---|---------|
| JP | 2009061786 A   | * | 3/2009  |
| JP | 4322792 B2     |   | 9/2009  |
| JP | 2014-079948 A  |   | 5/2014  |
| JP | 2015219149 A   | * | 12/2015 |

* cited by examiner

FIG. 2

| LOT NUMBER | MOLDING CONDITION | SHOT NUMBER | CAVITY NUMBER | MOLDED PRODUCT IMAGE | INSPECTION RESULT 522 |
|---|---|---|---|---|---|
| 1 | CONDITION 1 | 1 | 1 | DATA 1 | OK/NG MEASUREMENT VALUE |
| | | | 2 | DATA 2 | OK/NG MEASUREMENT VALUE |
| | | | 3 | DATA 3 | OK/NG MEASUREMENT VALUE |
| | | | 4 | DATA 4 | OK/NG MEASUREMENT VALUE |
| | | 2 | 1 | DATA 5 | OK/NG MEASUREMENT VALUE |
| | | | 2 | DATA 6 | OK/NG MEASUREMENT VALUE |
| | | | 3 | DATA 7 | OK/NG MEASUREMENT VALUE |
| | | | 4 | DATA 8 | OK/NG MEASUREMENT VALUE |

| LOT NUMBER | MOLDING CONDITION | PARTING SURFACE IMAGE | SHOT NUMBER | CAVITY NUMBER | MOLDED PRODUCT IMAGE | INSPECTION RESULT |
|---|---|---|---|---|---|---|
| 1 | CONDITION 1 | IMAGE 1 | 1 | 1 | DATA 1 | OK/NG MEASUREMENT VALUE |
| | | | | 2 | DATA 2 | OK/NG MEASUREMENT VALUE |
| | | | | 3 | DATA 3 | OK/NG MEASUREMENT VALUE |
| | | | | 4 | DATA 4 | OK/NG MEASUREMENT VALUE |
| | | | 2 | 1 | DATA 5 | OK/NG MEASUREMENT VALUE |
| | | | | 2 | DATA 6 | OK/NG MEASUREMENT VALUE |
| | | | | 3 | DATA 7 | OK/NG MEASUREMENT VALUE |
| | | | | 4 | DATA 8 | OK/NG MEASUREMENT VALUE |
| | | | ... | | | |

522b

MOLDING MACHINE MANAGEMENT SYSTEM AND COMPUTER PROGRAM

The present application is based on, and claims priority from JP Application Serial Number 2020-191044, filed Nov. 17, 2020, the disclosure of which is hereby incorporated by reference herein in its entirety.

BACKGROUND

1. Technical Field

The present disclosure relates to a molding machine management system and a computer program.

2. Related Art

Japanese Patent No. 4322792 discloses a monitoring device that monitors a molded product molded by injection molding. By displaying an image of a past molded product determined as a non-defective product, an image of a current molded product captured by a camera, and a molding condition of the molded product on the same screen, the monitoring device can determine occurrence of a burr of the molded product that cannot be grasped based on an actual measurement value of a sensor and the like.

However, when molding is performed using a molding mold having a plurality of cavities, a difference in positions of the cavities in the molding mold may influence the quality of the molded product. Therefore, it may be difficult to identify a reason of a molding defect only by comparison to an image of a reference molded product or the molding condition.

SUMMARY

The present disclosure can be implemented in the following forms.

According to a first aspect of the present disclosure, a molding machine management system is provided. The molding machine management system includes: a molding machine configured to mold a molded product using a molding mold having a plurality of cavities; a camera configured to capture an image of the molded product molded by the molding machine; an inspection device configured to inspect the molded product; and a management server including a control unit configured to acquire the image captured by the camera and an inspection result by the inspection device and cause a display unit to display the image and the inspection result. The management server includes a storage unit configured to store the image of the molded product, the inspection result of the molded product, and information on a cavity in which the molded product is molded in association with each other, and the control unit causes the image of the molded product molded by the molding machine, the inspection result of the molded product, and the information on the cavity in which the molded product is molded to be displayed on a same screen of the display unit.

According to a second aspect of the present disclosure, a non-transitory computer-readable storage medium storing a program is provided. The program causes a computer to implement a function of acquiring an image of a molded product molded by a molding machine configured to mold the molded product using a molding mold having a plurality of cavities, and an inspection result of the molded product, a function of storing, in a storage unit, the image of the molded product, the inspection result of the molded product, and information on a cavity in which the molded product is molded in association with each other, and a function of controlling a display unit to display the image of the molded product, the inspection result of the molded product, and the information on the cavity in which the molded product is molded on a same screen.

BRIEF DESCRIPTION OF THE DRAWINGS

FIG. 2 is a diagram showing a data structure of an inspection result database.

FIG. 5 is a diagram showing a data structure of an inspection result database according to a second embodiment.

DESCRIPTION OF EXEMPLARY EMBODIMENTS

A. First Embodiment

Figure 1:
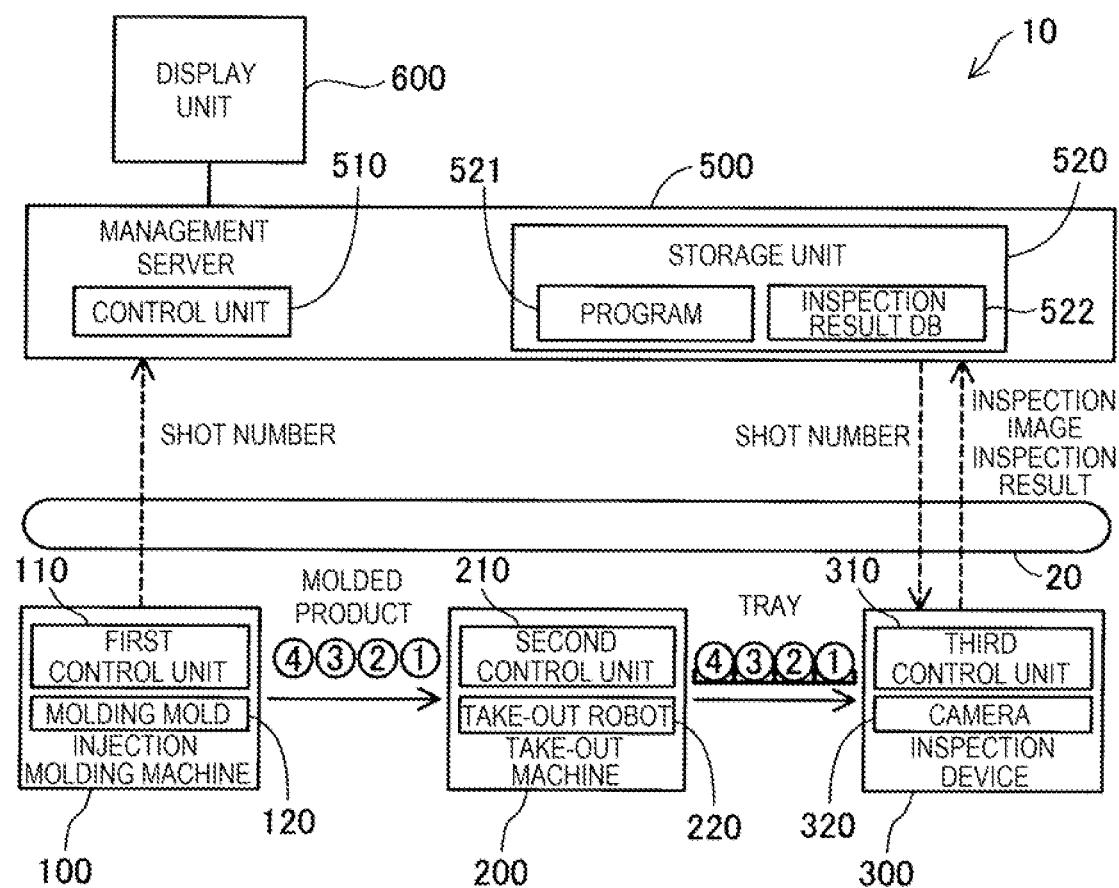
FIG. 1 is a block diagram showing a schematic configuration of a molding machine management system.

FIG. 1 is a block diagram showing a schematic configuration of a molding machine management system 10 according to a first embodiment. The molding machine management system 10 includes an injection molding machine 100 as a molding machine that molds a molded product, a take-out machine 200 that takes out the molded product, an inspection device 300 that inspects the molded product, and a management server 500. The take-out machine 200 and the inspection device 300 are peripheral devices of the injection molding machine 100. The peripheral device refers to a device or equipment that performs a step after injection molding by the injection molding machine 100. The molding machine management system 10 is not limited to including the take-out machine 200 and the inspection device 300 as the peripheral device, and may include, for example, a gate cutting device that cuts a gate of the molded product. In FIG. 1, a flow of the molded product molded by the injection molding machine 100 is indicated by solid line arrows.

The injection molding machine 100 includes a first control unit 110 and a molding mold 120. The molding mold 120 includes a fixed mold and a movable mold. As the molding mold 120, a metal mold or a resin mold is used. The injection molding machine 100 further includes an injection unit and a mold clamping device (not shown). The first control unit 110 is implemented by a computer including one or a plurality of processors, a memory, and an input and output interface for inputting and outputting signals to and from an outside. The first control unit 110 may be implemented by a plurality of computers. A second control unit 210 of the take-out machine 200 and a third control unit 310 of the inspection device 300, which will be described later, have the same configuration as the first control unit 110.

The first control unit 110 controls each unit of the injection molding machine 100 to perform the injection molding and mold the molded product. More specifically, the first control unit 110 controls the injection unit to inject a molten material into the molding mold 120, and controls the mold clamping device to clamp the molding mold 120, thereby molding the molded product having a shape corresponding to a shape of a cavity. In the present embodiment, a plurality of cavities are formed in the molding mold 120. Therefore, a plurality of molded products are simultaneously molded by one injection molding. A unique identifier is assigned to each cavity as information on the cavity. In the present embodiment, a unique cavity number is assigned to each cavity as an identifier.

The take-out machine 200 includes the second control unit 210 and a take-out robot 220. The second control unit 210 controls an operation of the take-out robot 220. The take-out robot 220 is a robot that takes out the molded product from the molding mold 120 of the injection molding machine 100. The take-out robot 220 of the present embodiment grips and takes out the molded product, which is demolded from the molding mold 120 by an ejector pin provided in the injection molding machine 100, by an end effector attached to a distal end of an arm of the take-out robot. The take-out robot 220 places the taken-out molded products on a tray in the order of cavity numbers. That is, each molded product is disposed at a position on the tray corresponding to the cavity number of the cavity in which the molded product is molded. The tray on which the molded product is placed is conveyed to the inspection device 300 by a conveying device (not shown) or the take-out robot 220.

The inspection device 300 includes the third control unit 310 and a camera 320. The third control unit 310 controls the camera 320 to capture images of the molded products in the order of cavity numbers, and analyzes the captured images of the molded products to perform appearance inspection of the molded products. The image captured by the camera 320 and used for the inspection is hereinafter referred to as an inspection image. The third control unit 310 determines whether the appearance is abnormal for each molded product by the appearance inspection using the inspection image. A determination result of the abnormality is hereinafter referred to as an inspection result. In the present embodiment, the inspection result includes not only presence or absence of abnormality but also a measurement value obtained by analyzing and measuring the inspection image by the inspection device 300.

The management server 500 includes a control unit 510 and a storage unit 520. The control unit 510 is implemented by a computer including one or a plurality of processors, a memory, and an input and output interface for inputting and outputting signals to and from an outside. The storage unit 520 stores a computer program 521 for controlling the molding machine management system 10 and an inspection result database 522. The control unit 510 loads the computer program stored in the storage unit 520 into the memory and executes the computer program, thereby causing the management server 500 to implement a function of acquiring the inspection image and the inspection result of the molded product and causing the storage unit 520 to store the inspection image and the inspection result and a function of causing a display unit 600 to display information on the inspection image and information of the inspection result. The computer program 521 may be recorded in a computer-readable recording medium such as a memory card or an optical disk.

The management server 500 can communicate with the injection molding machine 100, the take-out machine 200, and the inspection device 300 via a network 20. The network 20 may be, for example, an LAN, a WAN, or the Internet.

The display unit 600 is coupled to the management server 500. As the display unit 600, for example, a liquid crystal display or an organic EL display is used. In addition, for example, a tablet terminal or a mobile terminal coupled to the management server 500 via the network 20 may be used as the display unit 600.

The control unit 510 acquires the inspection image of the molded product captured by the camera 320 and the inspection result of the molded product from the inspection device 300 via the network 20. The control unit 510 records the acquired data in the inspection result database 522 stored in the storage unit 520.

FIG. 2 is a diagram showing a data structure of the inspection result database 522 stored in the storage unit 520. A lot number is recorded in the inspection result database 522. The lot number is determined according to a manufacturing period such as a manufacturing day, a manufacturing week, or a manufacturing month. In the inspection result database 522, molding condition data representing a molding condition in a lot is associated with the lot number. The molding condition data includes, for example, a cylinder temperature, a mold temperature, and an injection pressure.

Further, the lot number is associated with a shot number of each shot in which the injection molding is performed in the lot. Each shot number is associated with information on the cavity in which the molding is performed in the shot. In the present embodiment, the information on the cavity is the cavity number assigned to each cavity. The cavity number is associated with the inspection image of the molded product molded and inspected in the cavity corresponding to the cavity number in the shot number of the lot. The cavity number is further associated with the inspection result of the molded product.

A procedure of associating the cavity number with the molded product generated in each cavity will be described with reference to FIG. 1. When the molded product is molded in the injection molding machine 100, the shot number is notified from the first control unit 110 of the injection molding machine 100 to the management server 500. The molded products molded in the injection molding machine 100 are taken out from the molding mold 120 by the take-out machine 200, and are arranged on the tray in the order of cavity numbers. After receiving the shot number from the management server 500, the inspection device 300 inspects the molded products in the order of arrangement on the tray. That is, the inspection device 300 inspects the molded products in the order of cavity numbers. The third control unit 310 of the inspection device 300 assigns a file name generated by combining the cavity number with the shot number received from the management server 500 to each inspection image. The third control unit 310 of the inspection device 300 associates the inspection image to which the file name is assigned in this way with the inspection result corresponding to the inspection image, and transmits the inspection image and the inspection result to the management server 500. Then, the control unit 510 of the management server 500 analyzes the file name of the received inspection image, associates the shot number, the cavity number, the inspection image, and the inspection result with the current lot number, and stores these pieces of information in the inspection result database 522. When the lot number is changed in the management server 500, the control unit 510 of the management server 500 transmits a predetermined command to the injection molding machine 100 to initialize the shot number.

Figure 3:
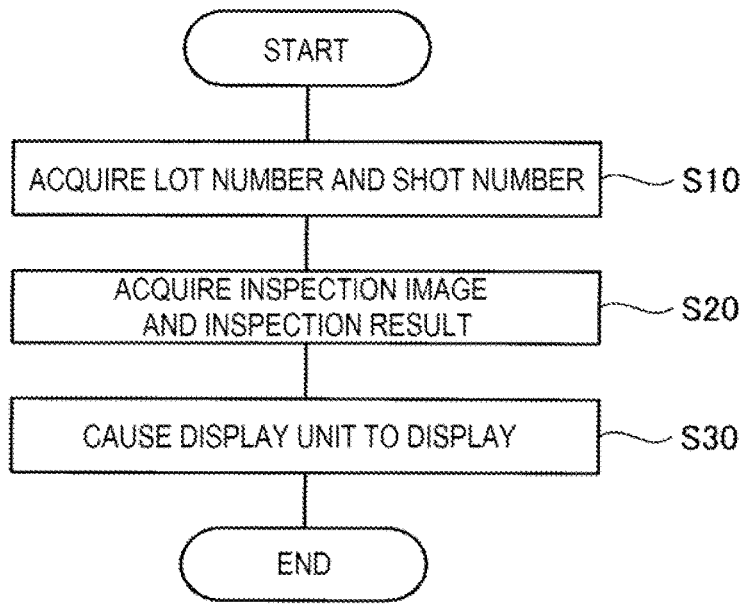
FIG. 3 is a flowchart of inspection result display processing.

FIG. 3 is a flowchart of inspection result display processing executed by the control unit 510 of the management server 500. The processing is executed when the control unit 510 receives a predetermined operation from an administrator via a predetermined input device such as a touch panel or a mouse coupled to the management server 500. The processing may be executed while a molding cycle is performed or may be executed while the molding cycle is stopped in the molding machine management system 10.

In step S10, the control unit 510 acquires the lot number and the shot number from the administrator via the input device.

In step S20, the control unit 510 acquires, from the inspection result database 522, the inspection image and the inspection result corresponding to the lot number and the shot number acquired in step S10 together with the molding condition data corresponding to the lot number.

In step S30, the control unit 510 causes each data acquired in step S20, that is, the inspection image of the molded product, the inspection result of the molded product, and the cavity number of the molded product to be displayed on the same screen of the display unit 600. That is, the control unit 510 causes the display unit 600 to simultaneously display the inspection image of the molded product, the inspection result of the molded product, and the cavity number of the molded product. Further, in the present embodiment, the lot number and the shot number acquired from the administrator in step S10 and the molding condition represented by the molding condition data acquired in step S20 are displayed on the same screen together with the inspection image, the inspection result, and the cavity number.

Figure 4:
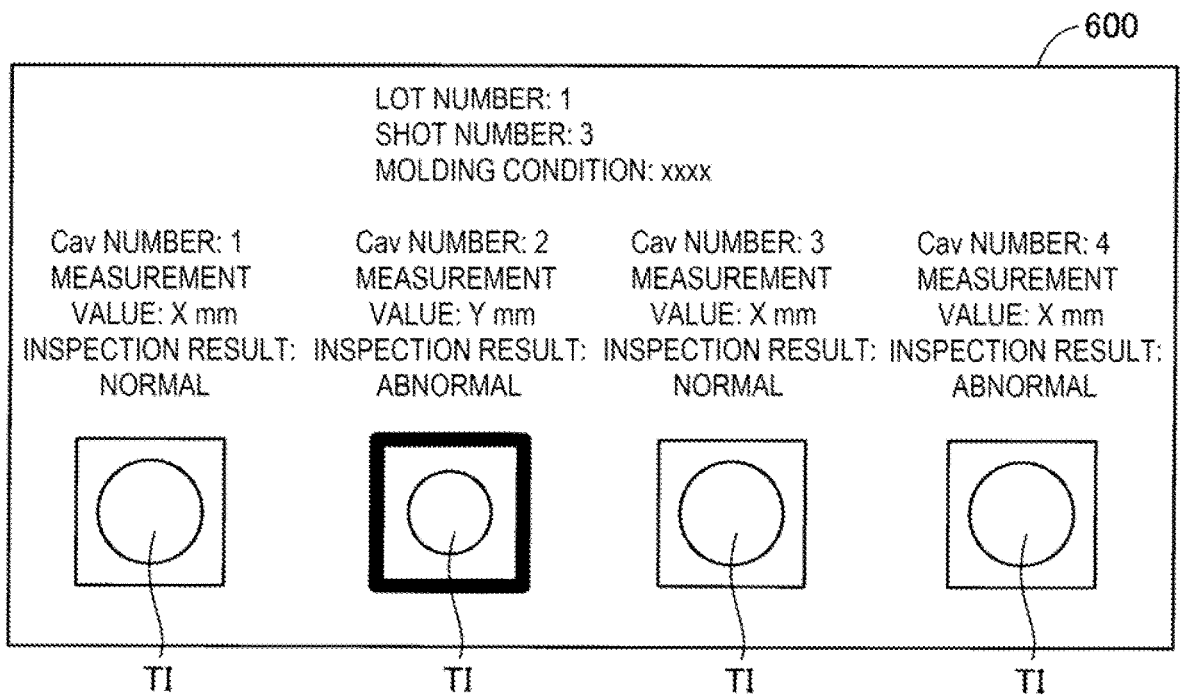
FIG. 4 is a diagram showing an example of display contents of a display unit.

FIG. 4 is a diagram showing an example of display contents of the display unit 600 according to the present embodiment. As shown in FIG. 4, in the present embodiment, the control unit 510 displays an inspection image TI of the molded product molded in each cavity in a row in the order of cavity numbers. FIG. 5 shows an inspection image TI of a circular molded product as an example of the molded product. The control unit 510 displays each inspection result in the vicinity of each inspection image TI. FIG. 4 shows an example in which "abnormal" or "normal" is displayed as the inspection result and the measurement value obtained by measurement using the inspection image TI is displayed. The measurement value shown in FIG. 4 represents a diameter of the molded product.

In the present embodiment, the control unit 510 causes the display unit 600 to display an inspection image TI of a molded product for which the inspection result is abnormal in a form different from an inspection image TI of a molded product for which the inspection result is normal. FIG. 4 shows an example in which the inspection image TI of the molded product determined to be abnormal is surrounded by a thick line. The image of the molded product determined to be abnormal may be displayed in a color different from that of the image of the molded product determined to be normal.

As shown in FIG. 4, in the present embodiment, the lot number, the shot number, and the molding condition are displayed on the same screen together with the cavity number, the inspection image TI, and the inspection result. In addition to these pieces of information, the control unit 510 may cause the display unit 600 to display, for example, a value of a management limit line or a standard value as numerical information used for quality management of the molded product. The management limit lines include an upper management limit line, a center line, and a lower management limit line, and the standard value includes an upper limit standard value and a lower limit standard value.

According to the molding machine management system 10 of the present embodiment described above, since the image of the molded product molded by the injection molding machine 100, the inspection result of the molded product, and the information on the cavity are displayed on the same screen, a relationship between the cavity in which the molded product is molded and the quality of the molded product can be easily confirmed. As a result, it is easy to identify a reason of a molding defect. For example, when cavities in which the molded products determined to be defective in the molding are continuously the same cavity, it can be identified that the molded product is defective due to the cavity. Further, for example, when the defect frequently occurs in the cavity even though there is no problem in the cavity or the molding condition, it can be estimated that the defect has occurred due to an influence from an adjacent cavity.

Further, in the present embodiment, since the image of the molded product molded by the injection molding machine 100, the inspection result of the molded product, and the information on the cavity are displayed on the same screen together with the molding condition, the molding condition when the abnormality occurs in the molded product can be easily grasped.

B. Second Embodiment

FIG. 5 is a diagram showing a data structure of an inspection result database 522*b* according to a second embodiment. In the inspection result database 522*b* in the present embodiment, an image of a parting surface of the molding mold 120 used in a lot is associated with a lot number. Other points are the same as those of the inspection result database 522 of the first embodiment. The image of the parting surface is captured by, for example, an administrator and recorded in the storage unit 520. Since a configuration of the molding machine management system 10 in the second embodiment is the same as that in the first embodiment, description thereof will be omitted.

Figure 6:
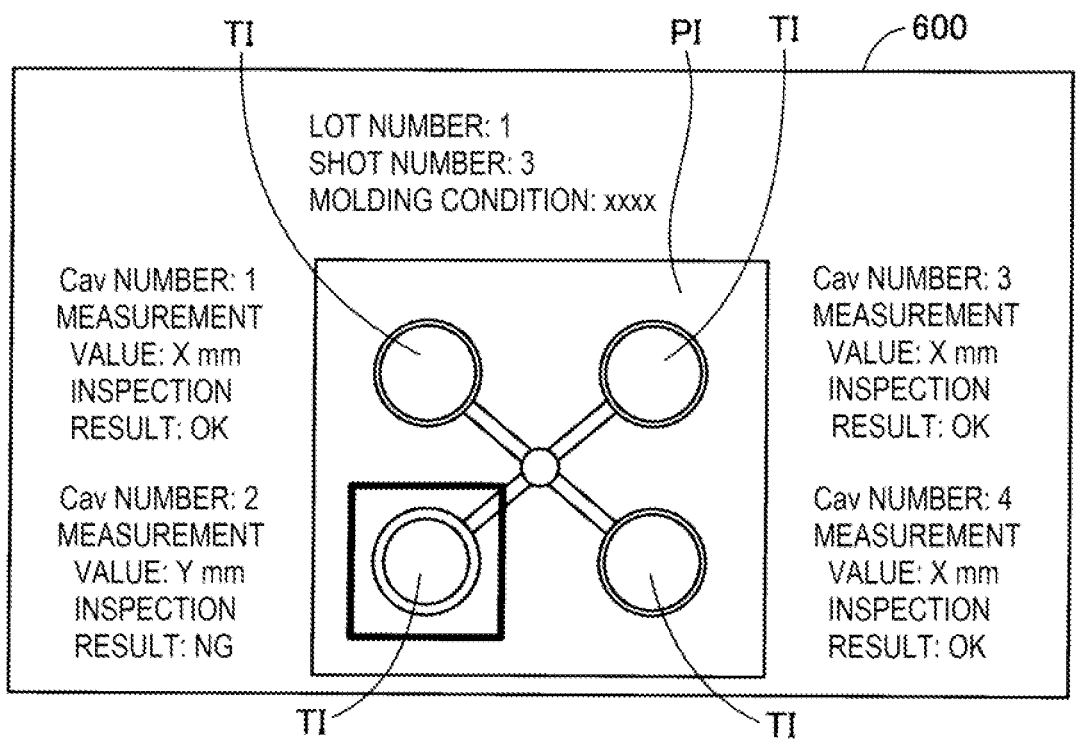
FIG. 6 is a diagram showing an example of display contents of a display unit according to the second embodiment.

FIG. 6 is a diagram showing an example of display contents of the display unit 600 according to the second embodiment. As shown in FIG. 6, in the present embodiment, the control unit 510 acquires an image PI of the parting surface having cavities of the molding mold 120 from the inspection result database 522*b*, and causes the inspection image TI to be displayed on the image PI of the parting surface according to an arrangement of the cavities. A position of each cavity in the parting surface is recorded, for example, in the inspection result database 522*b* together with the image PI of the parting surface. The control unit 510 causes a cavity number, an inspection result, and a measurement value to be displayed in the vicinity of the corresponding inspection image TI. Further, in the present embodiment, the lot number, a shot number, and a molding condition are displayed.

According to the second embodiment described above, since the inspection image of the molded product is displayed according to the arrangement of the cavities, a position of a cavity in which an abnormal molded product is molded can be easily grasped.

In the second embodiment, since the image of the parting surface in which the plurality of cavities are represented is displayed in association with information on the cavities, the arrangement of the cavities in the parting surface of the molding mold 120 can be easily grasped. In addition, the position of the cavity in which the abnormal molded product is molded can be easily grasped on the image of the parting surface.

In the present embodiment, the image of the parting surface of the molding mold 120 is displayed on the display unit 600. Alternatively, an image of the molded product may be displayed according to the arrangement of the cavities in the parting surface without displaying the image of the parting surface. Further, the administrator may be able to select display/non-display of the image of the parting surface.

C. Other Embodiments (C1) In the embodiments described above, the control unit 510 causes the image of the molded product for which the inspection result is abnormal to be displayed in a form different from the image of the molded product for which the inspection result is normal. In contrast, the control unit 510 may cause different inspection results to be displayed by characters, and may cause the image of the molded product to be displayed in the same form.

(C2) In the embodiments described above, the control unit 510 causes the image of the molded product molded by the injection molding machine 100, the inspection result of the molded product, and information on cavities to be displayed on the same screen together with the molding condition. In contrast, the display of the molding condition may be omitted. Further, when a predetermined operation is received from an administrator, the control unit 510 may cause the molding condition to be displayed on a screen different from that of the image of the molded product.

(C3) In the embodiments described above, the inspection device 300 performs inspection using an image captured by the camera 320. In contrast, the inspection device 300 may control a contact-type sensor or an optical sensor using a laser to inspect the molded product. In this case, the camera 320 that captures the image of the molded product may not be provided in the inspection device 300, and for example, may be provided in the take-out machine 200 or may be disposed on a path along which the tray is conveyed. Even in this case, the camera 320 images the molded product in the order of cavity numbers.

(C4) In the embodiments described above, the molding machine management system 10 may control a laser marking machine to mark a unique identifier obtained by combining a lot number, a shot number, and a cavity number on each molded product after the molded product is taken out by the take-out machine 200.

(C5) In the embodiments described above, the shot number is transmitted from the injection molding machine 100 to the inspection device 300 through the management server 500. In contrast, the shot number may be directly transmitted from the injection molding machine 100 to the inspection device 300 via the network 20.

D. Other Aspects

The present disclosure is not limited to the above-described embodiments, and can be implemented by various configurations without departing from the gist of the present disclosure. For example, in order to solve a part or all of problems described above, or to achieve a part or all of effects described above, technical characteristics in the embodiments corresponding to technical characteristics in aspects to be described below can be replaced or combined as appropriate. Further, the technical characteristics can be deleted as appropriate unless the technical characteristics are described as essential in the present specification.

(1) According to a first aspect of the present disclosure, a molding machine management system is provided. The molding machine management system includes: a molding machine configured to mold a molded product using a molding mold having a plurality of cavities; a camera configured to capture an image of the molded product molded by the molding machine; an inspection device configured to inspect the molded product; and a management server including a control unit configured to acquire the image captured by the camera and an inspection result by the inspection device and cause a display unit to display the image and the inspection result. The management server includes a storage unit configured to store the image of the molded product, the inspection result of the molded product, and information on a cavity in which the molded product is molded in association with each other, and the control unit causes the image of the molded product molded by the molding machine, the inspection result of the molded product, and the information on the cavity in which the molded product is molded to be displayed on a same screen of the display unit.

According to this aspect, since the image of the molded product molded by the molding machine, the inspection result of the molded product, and the information on the cavity in which the molded product is molded are displayed on the same screen, a relationship between the cavity in which the molded product is molded and the quality of the molded product can be easily confirmed. As a result, it is easy to identify a reason of a molding defect.

(2) In the aspect described above, the control unit may cause the display unit to display an image of a molded product for which the inspection result is abnormal in a form different from an image of a molded product for which the inspection result is normal. According to such an aspect, an abnormal molded product can be easily grasped.

(3) In the aspect described above, the control unit may cause the display unit to display the image of the molded product in accordance with an arrangement of the cavities in the molding mold. According to such an aspect, an abnormal molded product and a position of the cavity in which this molded product is molded can be easily grasped.

(4) In the aspect described above, the storage unit may store an image of a parting surface of the molding mold in which the plurality of cavities are represented, and the control unit may cause the display unit to display the image of the parting surface and the information on the cavity in association with each other. According to such an aspect, the arrangement of the cavities in the parting surface of the molding mold can be easily grasped.

(5) In the aspect described above, the storage unit may store a molding condition, and the control unit may cause the image of the molded product, the inspection result of the molded product, and the information on the cavity in which the molded product is molded to be displayed on the same screen together with the molding condition. According to such an aspect, the molding condition when abnormality occurs can be easily grasped.

(6) According to a second aspect of the present disclosure, a non-transitory computer-readable storage medium storing a program is provided. The program causes a computer to implement a function of acquiring an image of a molded product molded by a molding machine configured to mold the molded product using a molding mold having a plurality of cavities, and an inspection result of the molded product, a function of storing, in a storage unit, the image of the molded product, the inspection result of the molded product, and information on a cavity in which the molded product is molded in association with each other, and a function of controlling a display unit to display the image of the molded product, the inspection result of the molded product, and the information on the cavity in which the molded product is molded on a same screen.

What is claimed is:

1. A molding machine management system comprising:
a molding machine configured to mold a plurality of molded products using a molding mold having a plurality of cavities;
a camera configured to capture a plurality of firstimages of the plurality of molded products, respectively, molded by the molding machine;
an inspection device configured to inspect the plurality of molded products to provide a plurality of inspection results corresponding to the plurality of molded products, respectively; and
a management server including a processor configured to:
acquire the plurality of first images captured by the camera and the plurality of inspection results by the inspection device;
acquire a second image of a parting surface of the molding mold; and
cause a display to display the plurality of first images, the second image, and the plurality of inspectionresults, wherein
the management server includes a memory configured to store the plurality of first images, the second image, the plurality of inspection results of the plurality of molded products, and cavity information on the plurality of cavities in which the plurality of molded products are molded in association with each other,
the processor is configured to cause the display to display the plurality of first images of the plurality of molded products, the second image of the parting surface of the molding mold, the plurality of inspection results, and the cavity information on the plurality of cavities on a same screen of the display, and
the plurality of molded products in the plurality of first-image images are respectively displayed to overlap positions of corresponding cavities of the plurality of cavities of the parting surface in the second image.

2. The molding machine management system according to claim 1, wherein
the inspection device has an inspection controller, and the inspection controller is configured to:
determine a first molded product of the plurality of molded products is abnormal based on a first inspection result of the plurality of inspection results; and
determine a second molded product of the plurality of molded products is normal based on a second inspection result of the plurality of inspection results;
the processor is further configured to:
cause the display to display a first area corresponding to the first molded product in a first form; and
cause the display to display a second area corresponding to the second molded productin a second form, and
the first form is different from the second form.

3. The molding machine management system according to claim 1, wherein
the memory is further configured to store a molding condition, and
the processor is further configured to cause the display to display the plurality of first images, the second image, the plurality of inspection results, the cavity information, and the molding condition on the same screen of the display.

4. A non-transitory computer-readable storage medium storing a program for causing a computer to execute a process by a processor so as to perform the steps of:
acquiring a plurality of first images of a plurality of molded products, respectively, molded by a molding machine by using a molding mold having a plurality of cavities in which the plurality of molded products are molded, respectively;
acquiring a second image of a parting surface of the molding mold;
acquiring a plurality of inspection results of the plurality of molded products, respectively, inspected by an inspection device;
storing the plurality of first images, the second image, the plurality of inspection results, and cavity information on the plurality of cavities into a memory; and
displaying the plurality of first images, the second image, the plurality of inspection results, and the cavity information on a same screen of a display,
wherein the plurality of molded products in the plurality of first images are respectively displayed to overlap positions of corresponding cavities of the plurality of cavities of the parting surface in the second image.

5. The non-transitory computer-readable storage medium according to claim 4, wherein
the inspection device has an inspection controller, and the inspection controller is configured to:
determine a first molded product of the plurality of molded products is abnormal based on a first inspection result of the plurality of inspection results; and
determine a second molded product of the plurality of molded products is normal based on a second inspection result of the plurality of inspection results;
the processor is further configured to:
cause the display to display a first area corresponding to the first molded product in a first form; and
cause the display to display a second area corresponding to the second molded product in a second form, and the first form is different from the second form.

6. The non-transitory computer-readable storage medium according to claim 4, wherein the memory is further configured to store a molding condition, and the processor is further configured to cause the display to display the plurality of first images, the second image, the plurality of inspection results, the cavity information, and the molding condition on the same screen of the display.

* * * * *